United States Patent [19]
White

[11] 3,900,853
[45] Aug. 19, 1975

[54] STYLUS ACTUATOR
[75] Inventor: Robert Gordon White, Portland, Oreg.
[73] Assignee: Tektronix Inc., Beaverton, Oreg.
[22] Filed: May 6, 1974
[21] Appl. No.: 466,943

[52] U.S. Cl. .............................. 346/139 R; 346/29
[51] Int. Cl.² ........................................ G01D 15/24
[58] Field of Search ............... 346/139 R, 139 B, 29

[56] References Cited
UNITED STATES PATENTS
| | | | |
|---|---|---|---|
| 2,527,207 | 10/1950 | Barnes | 346/139 R |
| 2,806,758 | 9/1957 | Butler et al. | 346/139 R X |
| 3,333,273 | 7/1967 | Kallen et al. | 346/139 R X |
| 3,360,799 | 12/1967 | Polster | 346/139 R X |

Primary Examiner—Joseph W. Hartary
Attorney, Agent, or Firm—George T. Noe

[57] ABSTRACT

A stylus actuating mechanism for graphical recorders lowers and raises the recording stylus to recording and non-recording alternative positions in response to electrical signals applied to a remotely-mounted solenoid. A bar member for operating the stylus is pivotally mounted parallel to a stylus-holder guide means between a pair of carriage members which slidably move along a pair of parallel guide rails which are perpendicular to the stylus-holder guide means. The solenoid operates a shaft which is rotatably mounted parallel to one of the guide rails. The carriage member adjacent the shaft includes a cam member which slides along the shaft as the carriage member slides along its guide rail. An actuating rod mounted on the carriage member in engagement with the cam member transmits the shaft actuation to the bar member.

3 Claims, 4 Drawing Figures

STYLUS ACTUATOR

BACKGROUND OF THE INVENTION

In graphic recorders of the prior art, the recording element is usually mounted on a substantial bar or guide member that is parallel to one of the record axes, along which the recording element may be displaced axially in accordance with the magnitude of an electrical signal applied to the recorder. In graphic recorders of the type conventionally known as X-Y plotters which have a flat plotting surface to which a recording medium such as paper may be attached, the guide member including the recording element is adapted to move in an orthogonal direction, allowing the recording element to be displaced perpendicular to the axis of the guide member in response to electrical signals. Control of the movement of the recording element is usually effected by cable and pulley arrangements to move the recording element to any desired point on the recording medium.

The recording element for X-Y plotters is usually mounted on a carriage assembly which is transported by the moving guide member. The carriage assembly usually has a plurality of wheels which ride on the guide member, and usually these wheels include ball bearings to reduce friction. It is important that friction be kept to a minimum to provide an accurate representation of the displacing signal. Generally, these carriage assemblies have tended to be rather heavy and cumbersome because of the need to provide a smooth sliding or rolling action along the guide member, and consequently the carriage member had considerable inertia, resulting in the undesirable effects of overshoot being traced on the recording medium. Additionally, the guide member has been substantially massive to provide stable and accurate motion of the carriage assembly.

In recorders of the prior art, the recording element engages a cover member which encloses and conceals the operating details of the carriage assembly and guide member. The cover member is used to control the lowering and raising of the recording element to and from the recording medium. This has been accomplished by a solenoid or other device mounted on the guide member, which causes the cover member to pivot, lowering or raising the recording element.

In modern, high-speed plotting applications, there has been a dire need to simplify the carriage assembly and its associated guide member. Such a simplification would include a reduction of mass and hence reduce the inertial effects of the system, as well as reducing the complexity of component parts and eliminating the need for wiring to a solenoid or similar device mounted on the guide member.

In one prior art device disclosed in U.S. Pat. No. 3,333,273, issued to George H. Kallen et al., an attempt to simplify the carriage assembly and its associated guide member entailed rocking or tilting the entire guide member by means of a solenoid-actuated lifting bail located adjacent one edge of the plotting surface. While the solenoid is remotely positioned, considerable holding power is required by the solenoid, and several springs are required to bias the mechanism. Additionally, inertial effects are evident in the up-down movement of the recording element.

SUMMARY OF THE INVENTION

The present invention relates to graphical recorders and more particularly to X-Y plotters. According to the present invention, a first pair of cylindrical guide rods are provided parallel to one recording axis along which the carriage rides. The first pair of cylindrical guide rods are fixedly attached at each end thereof to a pair of carriage members, which ride along a second pair of guide rods perpendicular to the first pair of guide rods and parallel to the orthogonal recording axis.

The carriage assembly may be suitably constructed of lightweight material, such as plastic, and may have a lightweight cover plate to which the recording element is attached. The recording element may be a stylus or a pen device suitable for producing an ink mark. To eliminate confusion with the carriage members at each end of the first pair of guide rods, the carriage assembly including the recording pen will be hereinafter referred to as the stylus holder.

A bar member is pivotally mounted at each end thereof to each of the carriage members, so that it is parallel to the first pair of guide rods and passes between the body and cover of the stylus holder. When the bar is pivoted, the cover is lifted or dropped, raising or lowering the recording pen. A spring bias is affixed to the bar member to maintain it in a normally tilted attitude, thus maintaining the recording pen in its raised position. One end of the bar member has attached thereto a cam member which is engaged by operating means including an actuating rod located on one of the carriage members. The operating means further includes cam means which may slide along a square shaft which is rotably mounted adjacent to and in parallel with the second pair of guide rods as the carriage member slides along the second pair of guide rods. Thus when the square shaft is rotated, the pen can be lowered or raised at any position on a plotting surface. A solenoid which is remotely located rotates the square shaft between two alternative positions corresponding to the raised and lowered recording pen positions.

It is therefore one object of the present invention to provide an improved apparatus for activating the recording mechanism of an X-Y plotter.

It is another object of the present invention to provide an improved carriage mechanism for an X-Y recorder of light weight and low inertia.

It is a further object of the present invention to provide a recording mechanism in combination with a light weight, low inertia carriage assembly that is slidably mounted upon guide rods for movement in orthogonal axes and a simple pen-actuating mechanism controllable by a remote actuating means.

It is yet another object of the present invention to provide a simple pen-actuating mechanism including a rotatable shaft parallel to one recording axis and a rotatable bar parallel to an orthogonal recording axis for raising and lowering the recording element, and coupling means connected therebetween.

It is yet a further object of the present invention to provide an improved control for pen position which does not bear on the pen itself.

It is still another object of the present invention to provide an X-Y recorder having a solenoid for controlling the making of a record by rotating a shaft having a cam member slidably mounted theron which transmits rotary motion to a bar member for raising and lowering a hinged member upon which a recording element is mounted moving the recording element in and out of contact with a recording medium.

It is another object of the present invention to provide an X-Y recorder having a simple pen-actuating mechanism controllable by a solenoid including a rotatable shaft having a cam member slidably mounted thereon for operating a bar for raising and lowering the recording element in which the cam member has no torque applied thereto in either of two rotary positions for friction-free movement along the rotary shaft.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be understood, however, that the drawings are for the purpose of illustration and description only and are not intended as a definition of the limits of the invention.

DETAILED DESCRIPTION OF THE INVENTION

Figure 1:
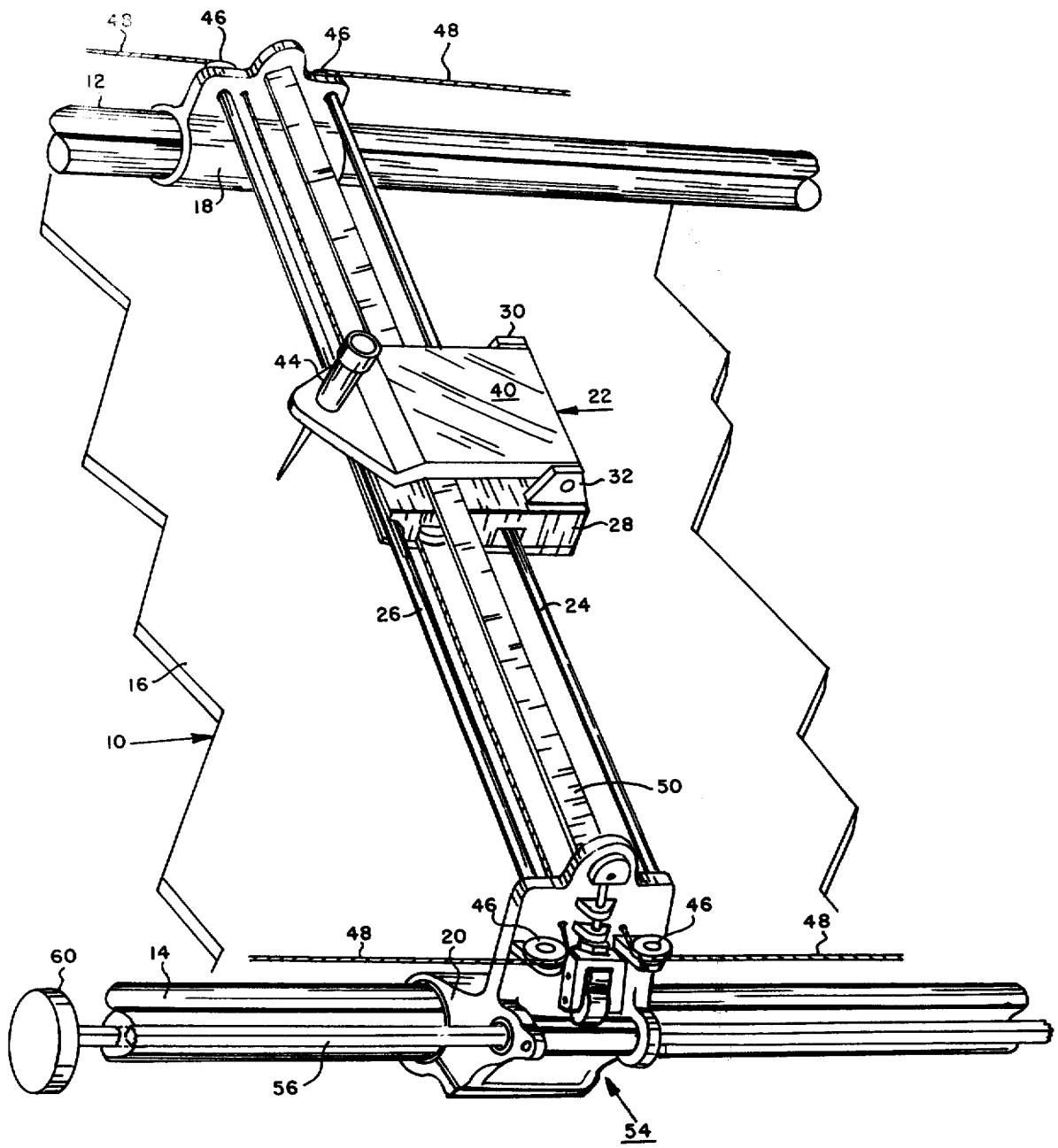
FIG. 1 illustrates a part perspective view of an X-Y recorder which includes the pen actuating mechanism.

In FIG. 1, an X-Y recorder 10 has parallel guide rods 12 and 14 adjacent plotting table 16 onto which a recording medium, such as paper, is secured. Carriage members 18 and 20 are movably mounted on guide rods 12 and 14 and they are reciprocably movable along guide rails 12 and 14 in accordance with conventional operating means such as cables and pulleys (not shown). The direction of carriage travel suitably establishes one of a pair of orthogonal recording axes.

A sliding stylus holder 22 is slidably mounted on guide rods 24 and 26 which have their ends secured in carriage members 18 and 20 and are carried thereby. Stylus holder 22 includes a body member 28 having a pair of projections 30 and 32 between which a cover plate 40 is pivotally attached. A recording element 44 which may suitably be a stylus or a pen is attached at a free end of the cover plate 40 so that recording element 44 records information on the recording medium on plotting table 16 as carriage members 18 and 20 move along guide rods 12 and 14 on one recording axis and stylus holder 22 slides along guide rods 24 and 26 on an orthogonal recording axis in accordance with the information being supplied to the operating means therefor. Operating means including pulleys 46 and cable means 48 operate to slidably move stylus holder 22 along guide rods 24 and 26 in accordance with conventional operating techniques. The sliding stylus holder 22 may suitably be that which is completely described in pending U.S. Pat. application Ser. No. 463,012 filed Apr. 22, 1974.

A bar member 50 is pivotally mounted at each end thereof to carriage members 18 and 20, in parallel relationship with guide rods 24 and 26 and passing between the body 28 and cover plate 40 of stylus holder 22. When the bar member 50 is flat relative to the plotting table 16, the cover plate 40 is in a lowered position and recording element 44 is in contact with the recording medium. When the bar member is pivoted, one edge thereof engages the cover plate 40 and raises it, lifting recording element 44 to a non-recording position.

An actuating mechanism 54, which will be fully described in subsequent paragraphs, is operably connected to and carried by carriage member 20 along a square shaft 56 which is rotatably mounted in parallel alignment with guide rod 14. A solenoid 60 is coupled to one end of shaft 56 to cause rotation thereof between two predetermined positions, thereby operating the actuating mechanism 54, the bar member 50, and the cover plate 40 in the manner to be described.

Figure 2:
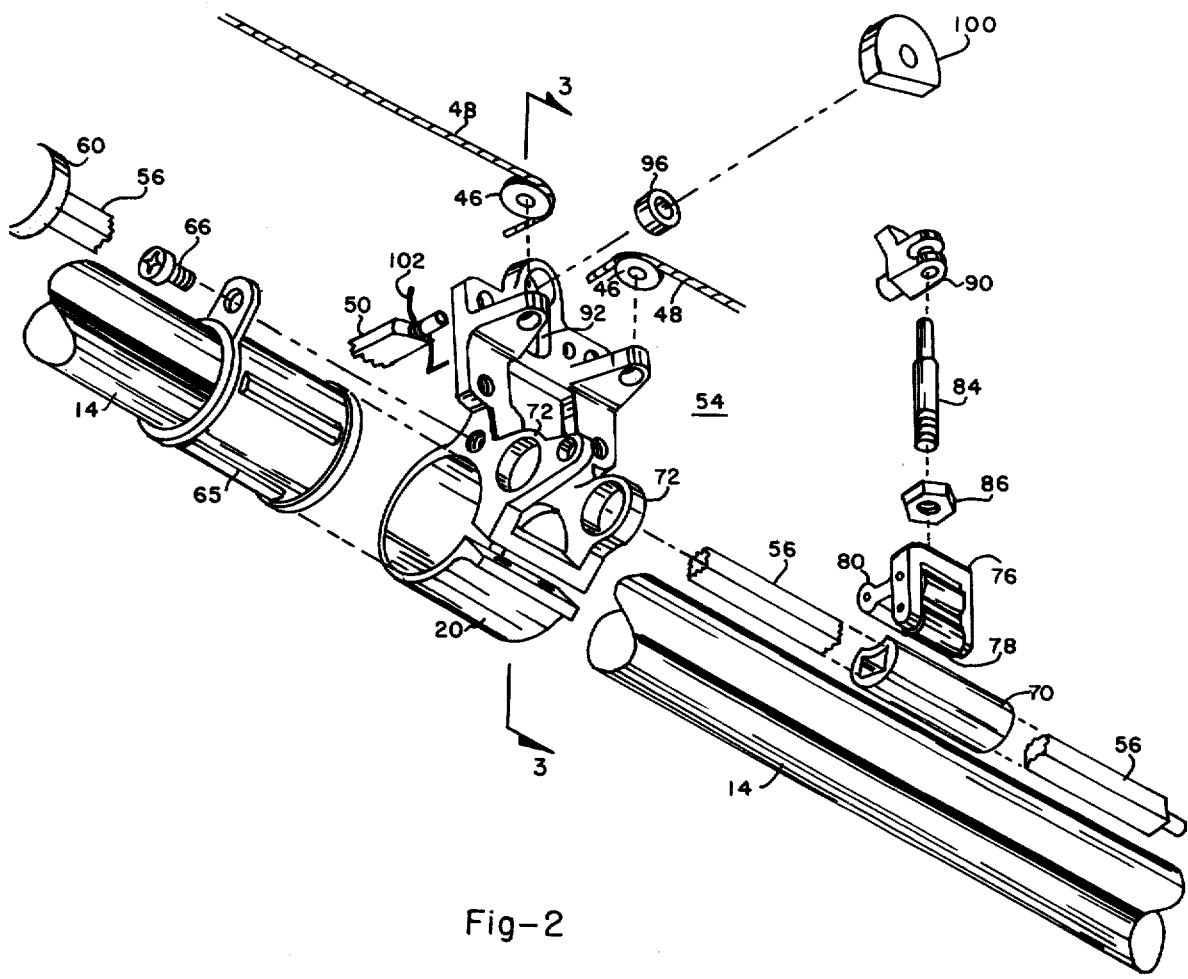
FIG. 2 is an exploded perspective view of the pen-actuating mechanism.

The exploded perspective view in FIG. 2 illustrates the pen-actuating mechanism 54, as well as the details of carriage member 20. A bearing housing 65, suitably constructed of plastic or the like, contains conventional linear ball bearings for smooth movement along guide rod 14. The bearing housing 65 is fitted into carriage member 20 and held in place with a machine screw 66. A cam member 70 is rotatably mounted on the carriage member 20 between a pair of boss bearings 72 and includes a square hole therethrough for sliding along shaft 56 as the carriage member 20 moves along guide rod 14. A bifurcated member 76 includes a roller 78 and a link 80, the free end of which is pivotally attached to carriage member 20. A rod 84 having a threaded end is screwed into a mating hole in member 76 and held in place with locking nut 86. Cam actuator 90 is secured to the opposite end of rod 84, for example, with a retaining ring (not shown), and is adapted for movement in slot 92 of carriage member 20. Actuating bar 50 is pivotally mounted in bearing 96 which is fit into a hole in carriage member 20. Cam 100, which may be constructed of a suitable plastic, is secured to the end of bar 50 for rotating the bar when actuated by cam actuator 90. Biasing spring 102 is mounted on either or both ends of the actuating bar 50 for holding the bar in a normally tilted position to thereby hold the recording element in a normally non-recording or raised position.

Figure 3:
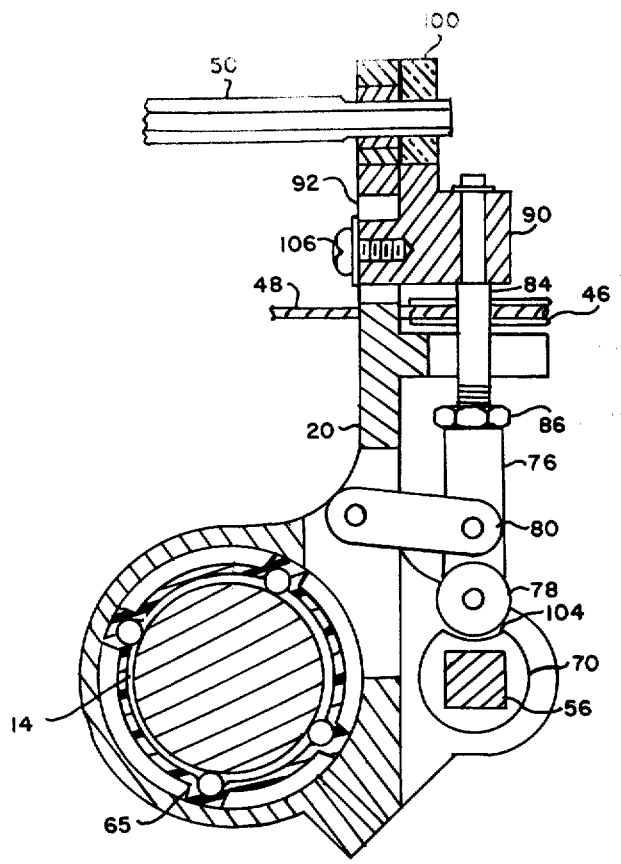
FIG. 3 is a cross-sectional view taken along lines 3—3 of FIG. 2.
Figure 4:
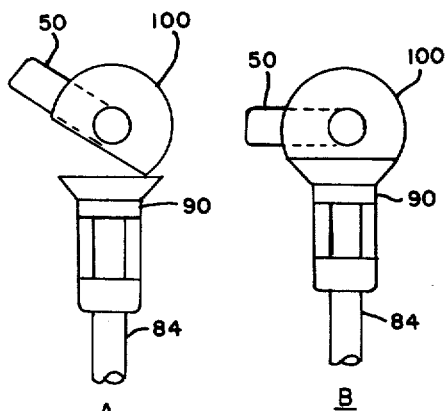
FIG. 4 illustrates the cam coupling portion of the pen-actuating mechanism for the two alternative pen positions.

Operation of the pen-actuating mechanism can best be understood from FIGS. 3 and 4. Cam member 70 is shown having a grooved portion 104 thereof located at a top position for the raised-pen condition. Roller 78 rests in groove 104, and the actuating bar 50 and cam 100 are substantially as shown in FIG. 4a where due to spring bias, cam 100 is rotated in a clockwise direction until one edge thereof rests on the flat face of cam actuator 90. In this condition, actuating bar 50 holds the recording element in a raised position as previously described, and as can be discerned, cam 70 is free to slide along square shaft 56. Cam 70 is constructed of a suitable plastic, such as Delrin, to reduce friction. When rotary solenoid 60 is pulsed with electrical power, square shaft 56 is rotated clockwise approximately 90 degrees, causing roller 78 to climb out of groove 104 to the outside diameter of cam 70. The electrical energizing power to rotary solenoid 60 may be reduced to a point sufficient to overcome only its own internal return spring.

As the roller 78 moves upward out of groove 104 to the outside diameter of cam 70, bifurcated member 76, rod 84, and cam actuator 90 are carried upward, causing cam 100 to rotate counterclockwise until its flat face matches the flat face of actuator 90 as shown in FIG. 4b. Actuating bar 50 is pivoted to its lower position, lowering the recording element to its recording position in contact with the recording medium. Rod 84 may be adjusted by loosening locking nut 86 and turning rod 84 until the correct mating of cam 100 and actuator 90 is achieved, then locking nut 86 retightened. As can be discerned, cam 70 is permitted to slide freely along square shaft 56 since no torque is applied to the cam in either of its two rotary positions. Cam actuator 90 may be constrained to only updown movement by a screw and flatwasher assembly 106 secured to actuator 90 from the back side of slot 92.

When electrical power is removed from solenoid 60, it de-energizes and rotates counterclockwise, allowing roller 78 to drop into groove 104, pulling cam actuator downward. Cam 100 then rotates clockwise due to spring bias, pivoting bar 50 and raising the recording element.

As can be discerned, there has been disclosed a novel and unique pen-actuating mechanism for use on graphical recorders or in conjunction with other recording means. It will therefore be appreciated that the aforementioned and other objects have been achieved; however, it should be emphasized that the particular embodiment of the invention, which is shown and described herein, is intended as merely illustrative and not as restrictive of the invention.

What I claim as new is:

1. In a graphic recorder having a recording element for recording information on a recording medium, a first pair of guide rods disposed adjacent a plotting surface along a first recording axis, a pair of carriage members adapted for movement along said first pair of guide rods, a second pair of guide rods mounted between said carriage members and positioned along a second recording axis orthogonal with said first recording axis, and a stylus holder slidably mounted on said second guide rods for movement over a plotting surface, said stylus holder including a pivotal plate carrying said recording element actuator comprising:

selectively actuable energizing means having first and second rotational positions;

a rotatable shaft connected to said energizing means and disposed in axial parallelism with said first pair of guide rods;

first cam means slidably mounted on said rotatable shaft and carried by one of said carriage members, said first cam means having a substantially cylindrical shape with a groove extending longitudinally along the outer surface thereof;

pivotal bar means disposed parallel to said second pair of guide rods and passing between said pivotal plate and said plotting surface, said pivotal bar means having a first rotational position about a longitudinal axis thereof for holding said recording element in a non-recording position and a second rotational position for holding said recording element in a recording position; and coupling means operatively connected to said one of said carriage members to transmit rotational motion of said energizing means to said pivotal bar means for selectively moving said recording element in and out of engagement with said recording medium, said coupling means including pushrod means engaging said first cam means at one end thereof and said pivotal bar means at the other end thereof, wherein said rod means rests in said groove in said first cam means in one rotatable position and on the outside wall of said first cam means in the second rotatable position so that any force exerted by said rod means upon said first cam means is directed toward the axis of said first cam means to thereby preclude torque from being applied to said first cam means and said energizing means in either of two rotatable positions thereof.

2. The recording element actuator according to claim 1 wherein said pivotal bar means includes second cam means attached thereto for engagement with said pushrod means, and spring bias means operably connected thereto to urge said pivotal bar means toward said first rotational position to thereby reduce force exerted by said pushrod means upon said first cam means.

3. The recording element actuator according to claim 1 wherein said energizing means is a rotary solenoid to which energy applied thereto is sufficient to cause rotation thereof and then reduced to hold the shaft thereof in the energized position.

* * * * *